3,399,225
PROCESS FOR PRODUCING AROMATIC NITRILES
Kimio Tarama, Yoshio Kobayashi, and Kentaro Hattori, Kyoto, Japan, assignors to Nippon Carbide Kogyo Kabushiki Kaisha, Tokyo, Japan, a corporation of Japan
No Drawing. Filed July 15, 1964, Ser. No. 382,956
Claims priority, application Japan, July 30, 1963, 38/37,811
9 Claims. (Cl. 260—465)

ABSTRACT OF THE DISCLOSURE

A process for producing aromatic nitriles wherein a mixture of a halogen other than fluorine, an alkyl or alkenyl hydrocarbon and ammonia are reacted at a temperature of from 300–550° C. All or part of the halogen may be substituted by a halide which under the reaction conditions liberates the corresponding halogen in the presence of an oxygen-containing gas.

---

This invention relates to a new process for producing aromatic nitriles from substituted aromatic compounds having as substituted radicals at least one member selected from alkyl and alkenyl radicals. More particularly, the invention relates to a process for producing aromatic nitriles from substituted aromatic compounds having as substituents at least one member selected from alkyl and alkenyl radicals, in the presence of ammonia and halogens other than fluorine (when either oxygen or an oxygen-containing gas is to be also present, all or a part of said halogen can be substituted by a halide). In accordance with this invention, aromatic nitriles can be produced to advantage by the suitable choice of the starting material and reaction conditions (principally the reaction temperature).

More specifically, the invention concerns a process for the production of aromatic nitriles wherein a mixture consisting of halogen other than fluorine, ammonia and a substituted aromatic compound having as a substituent at least one member selected from alkyl and alkenyl radicals is heated to a temperature of about 250–550° C.; and with the same objective the present invention is directed to a process for producing aromatic nitriles wherein a mixture consisting of ammonia, an aromatic compound substituted with an alkyl halide or alkenyl halide containing halogen other than fluorine, other halides, and an oxygen-containing gas (to apply hereinafter generically to oxygen, air, and mixtures of these and inert gases) is heated to a temperature of about 250–550° C.

The process of the instant invention also comprehends the following modes:

(1) A process which comprises heating to a temperature of about 250–550° C., preferably in the presence of a filler, a mixture consisting of a halogen gas other than fluorine, a substituted aromatic compound having as a substituent at least one member selected from alkyl and alkenyl radicals, and ammonia.

(2) A process which comprises heating to a temperature of about 250–550° C. a mixture consisting of a halide of halogen other than fluorine, a substituted aromatic compound having as a substituent at least one member selected from alkyl and alkenyl radicals, ammonia and oxygen.

(3) The process itemed above as No. 1 in which oxygen is also present.

(4) The process itemed above as No. 2 in which a halogen gas other than fluorine is also present.

Generally, the process wherein a compound having a methyl radical and a mixed gas of ammonia and oxygen and/or air are heated to an elevated temperature in the neighborhood of 400° C. in the presence of a catalyst to obtain the corresponding nitriles has been well known heretofore as ammoxydation. When this reaction is shown by means of an equation, taking, for example, the synthesis of benzonitrile from toluene, it is as in Equation 1, below.

(1) $C_6H_5CH_3 + NH_3 + 3/2 O_2 \longrightarrow C_6H_5CN + 3H_2O + 126 \text{ kcal}$ The reaction of the foregoing Equation 1 is normally carried out at 400–500° C. using as the catalyst one similar to the oxidation reaction catalyst of the vanadium type. The serious defect of this process was that it is an exothermic reaction in which much heat is evolved. Accordingly, the reaction temperature is so high as to approach the combustion temperature of the hydrocarbon, and a combustion reaction frequently concurs, thereby bringing about a decrease in the yield.

With a view to remove this defect we conducted a series of researches wherein sulfurous acid gas was used as the oxidant. This is weaker in its oxidative ability than oxygen and evolves less reaction heat. As a result of these researches, it was found that, besides its dehydrogenation ability to contribute favorably to the nitrilation reaction as represented by Equation 3, below.

(2)
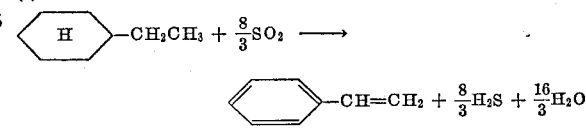

(3)
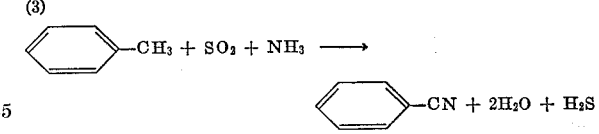

While it can be expected that in accordance with the reaction of Equation 3 benzonitrile would result via benzaldehyde and benzamide in view of the heretofore believed reaction mechanism of ammoxydation, actually this reaction takes place in the neighborhood of 400° C. on activated alumina, and it is presumed that at this temperature the sulforous acid gas reacts on the activated alumina to be converted to a substance which readily becomes such radicals as ammonium polysulfide or polythiosulfate, which radicals react with the methyl radical to extract the hydrogen atom therefrom to form a benzyl radical, then to become benzylamine, which in turn becomes benzonitrile by dehydrogenation. In these series of chain reactions of the radicals, it is believed that the hydrogen atom extraction reaction by means of the polysulfide radical controls the rate of the nitrilation reaction.

Upon further researches with the intention of carrying out this type of reaction to still greater advantage by means of the substance which readily forms the radicals by which the hydrogen atom reaction is conveniently initiated, we found that halogens other than fluorine operated favorably in the nitrilation and dehydrogenation reactions.

Further, it was also found that the halogens other than fluorine, i.e., chlorine, bromine and iodine, not only could be used as a halogen gas, but also that the halides capable of generating halogens other than fluorine in the presence of an oxygen-containing gas could be used, replacing wholly or partly the foregoing halogens. As such halides, it was found that the starting material i.e., alkyl halide-substituted and/or alkenyl halide-substituted aromatic compounds, which are halides of the aromatic compounds having as substituents at least one member selected from alkyl or alkenyl radicals, could also be utilized.

Accordingly, it is an object of the present invention to provide a process for producing aromatic nitriles from the aforementioned aromatic compounds by utilizing as the substance which readily forms radicals by which the dehydrogenation reaction is initiated the halogens other than fluorine (comprehending the instance where halides are substituted wholly or partly therefor in those cases where the reaction is carried out in the presence also of an oxygen-containing gas such as oxygen, air, etc.).

Another object of this invention is to provide a process for attaining the same object by carrying out the reaction in the same manner, using wholly or partly in substitution of the aforesaid halogens an alkyl halide-substituted and/or alkenyl halide-substituted aromatic compound.

A further object of the invention is to provide a process for attaining the same object by substituting wholly or partly the foregoing halogen gas other than fluorine with a halide other than the aforementioned alkyl halide-substituted and/or alkenyl halide-substituted aromatic compounds, for example, the halides such as hydrogen halide and haloform.

Other objects and advantages of the invention will be apparent from the following description.

The invention process is described in further detail below.

The alkyl-substituted aromatic compound used in this invention also includes nucleus-hydrogenated compounds. Such a nucleus-hydrogenated compound does not impede the reaction at all, as it is dehydrogenated and reacts entirely in the same manner as those which have not been nucleus-hydrogenated. The alkyl or alkenyl radicals which are the substituents of the foregoing aromatic compounds to be used in this invention are preferably those of not more than 4 carbon atoms. Such radicals include, for example, methyl, ethyl, n-propyl, isopropyl, n-butyl, isobutyl, vinyl, n-propenyl, isopropenyl and butenyl-1. Further, the aromatic compounds may also have besides the foregoing substituents those radicals which do not participate in the reaction, for example, such as halogens and nitriles.

Specific examples of such alkyl and/or alkenyl-substituted aromatic compounds to be used in the invention process include the alkyl-substituted aromatic compounds such as, for example, toluene, ethylbenzene, n-propylbenzene, cumene, butylbenzene, o-oxylene, m-xylene, p-xylene, o-, m- and p-ethyltoluene, o-, m- and p-isopropyltoluene, o-, m- and p-diethylbenzene, o-, m- and p-isopropylethylbenzene, o-, m- and p-diisopropylbenzene, alpha-methylnaphthalene, beta-methylnaphthalene, dimethylnaphthalene and mono- or dimethylanthracene; the alkyl-substituted nucleus-hydrogenated aromatic compounds such as, for example, methylcyclohexane, ethylcyclohexane, n-propylcyclohexane, isopropylcyclohexane, dimethylcyclohexane, methylethyl cyclohexane, methylisopropylcyclohexane, diethylcyclohexane, ethylisopropylcyclohexane, diisopropylcyclohexane and trimethylcyclohexane; the alkenyl-substituted aromatic compounds such as, for example, styrene, alpha-methyl styrene, alnpha-ethyl styrene, divinylbenzene, monovinylstyrene, allyl benzene, n- or isopropenylbenzene and butenyl-1-benzene; the alkyl and alkenyl-substituted aromatic compounds such as, for example, o-, m- and p-vinyltoluene, o-, m- and p-ethylstyrene, o-, m- and p-methyl-alpha-methylstyrene, o-, m- and p-ethyl-alpha-methylstyrene; and the compounds having CN, $NO_2$, F, Cl, Br and I as substituents bonded to the nucleus of the foregoing aromatic compounds.

When the process of the invention is illustrated, as an example, with reference to the production of benzonitrile from toluene, the reaction can be represented by the following Equation 4 wherein X is a halogen other than fluorine (4)  $C_6H_5CH_3 + 3X_2 + NH_3 \rightarrow C_6H_5CN + 6HX$ On the other hand, if ethylbenzene is used as the aromatic compound concurrently with the dehydrogenation of the side chain, the nitrilation reaction also takes place and styrene, benzonitrile, benzyl cyanide and halides are obtained as products.

When as the halogen in Equation 4 chlorine, bromine and iodine are used, the reaction heat evolved is 82 kcal./mol, 25 kcal./mol and −39 kcal./mol, respectively. While the invention process, as represented by Equation 4, can be carried out either at atmospheric or superatmospheric pressures, it is generally preferred to carry out the reaction at superatmospheric pressures or by heating to a temperature of about 250–550° C. a reaction tube filled with a filler which increases the surface concentration of the reaction substances, i.e., generally a substance predominantly of an inert adsorptive solid such as, for example, aluminum oxide, active carbon, diatomaceous earth, magnesium oxide, titanium dioxide, zinc oxide and gypsum, and thereafter passing the material mixture therethrough in a gaseous state. The reaction temperature is generally the lowest when, of the halogens i.e., iodine, bromine and chlorine, bromine is used. Further, the reaction may also be carried out in the presence of an inert gas such as nitrogen.

When a filler has been used, the accumulation of ammonium halide on the surface of the filler at relatively low reaction temperatures is excessive, with the consequence that a rapid undesirable decrease in activity takes place. On the other hand, at elevated temperatures, it is undesirable since dealkylation products are produced as by-products. Thus, the present process is carried out at temperatures within the range of from 250 to 550° C., preferably from about 300 to about 450° C. The use of the halide and ammonia in stoichiometric quantities, as shown in Equation 4, or less is convenient from the operations standpoint. It is, of course, possible to use more than the stoichiometric quantities.

Further, according to the invention process, by effecting the presence in the reaction system of also an oxygen-containing gas such as, for example, oxygen and air alone or as a mixture thereof or as a mixed gas thereof with inert gases, the formation of ammonium halide as a by-product, which tend to occur in the reaction of Equation 4 can be prevented. In addition, as the hydrogen halide formed in Equation 4 is oxidized by the foregoing oxygen or oxygen-containing gas to form halogen (see Equation 5 given hereinafter), with the consequence that the amount of the halogen used can be reduced considerably, it is commerically advantageous. Hence, the conjoint use of a halogen gas with an oxygen-containing gas is especially preferred in the invention process. In this case, while outwardly the reaction resembles the reaction of Equation 1 and the evolution of heat cannot be avoided, in the following points it differs from the prior art ammoxydation process. First, the reaction temperature is low and the amount of air used is considerably less than in the case of Equation 1. In addition to these advantages, there is the point that the control of the reaction operations is very easily accomplished and also that there is no need at all of the use of a catalyst as in the case of Equation 1. Hence, differing from the prior art ammoxydation process in these points, the process of the present invention is commerically of great advantage.

Although the amount of the oxygen-containing gas used is determined in consideration of such matters as the reaction heat, halogen recovery and the disposition of the ammonium halide, preferably the reaction is carried out in a range in which the concentration of the material gas is higher than the upper limit of the explosion range of the mixed gas of the material gas and the oxygen-containing gas, i.e., under conditions wherein the amount of the oxygen-containing gas is relatively small.

Further, when an oxygen-containing gas is to be used in the invention process, the halogen need not necessarily be fed in molecular form, it being possible to carry out the reaction by substituting wholly or partly the aforesaid molecular halogens with halides which form halogen radicals by pyrolysis and oxidation. As such halides, included, for example, are hydrogen halide, benzyl halide and haloform, which may be used alone or as mixtures. Thus, when the reaction in accordance with the invention process is to be carried out in the presence of an oxygen-containing gas, the halogens used are not limited to the molecular halogens, but it is also possible to substitute wholly or partly therefor the organic and inorganic halides that conform halogen radicals under reaction conditions. Hence, it is to be understood that the present invention comprehends such instances also.

When in accordance with the invention process a halide, e.g., haloform to hydrogen halide, is used in the presence of an oxygen-containing gas, as hereinabove described, halogen will be fed into the reaction system as shown in the Equations 5 and 5', below, and the reaction is carried out similarly as in the case with the foregoing Equation 4.

(5) $\quad CHX_3 + \frac{5}{4}O_2 \longrightarrow \frac{3}{2}X_2 + CO_2 + \frac{1}{2}H_2O$ (5') $\quad HX + \frac{1}{4}O_2 \longrightarrow \frac{1}{2}H_2O + \frac{1}{2}X_2$ By this process, the aromatic nitrile can be produced directly.

For example, when benzyl halide, ammonia and air are reacted, it is believed the reaction of Equation 6, below, takes place, but at the same time other hydrocarbons are present, these will form nitriles outwardly by means of the reaction represented by Equation 1 using as the catalyst the halogen liberated by Equation 6.

(6) $\quad C_6H_5CH_2X + NH_3 + \frac{3}{4}O_2 \longrightarrow C_6H_5CN + \frac{5}{2}H_2O + \frac{1}{2}X_2$ Further, when the mode as represented by Formula 6 is adopted, the reaction can be carried out in such a manner that the $1/2X_2$ shown in Equation 6 is used to still greater advantage by using as the material aromatic compound a mixture of an alkyl or alkenyl-substituted aromatic compound and an aromatic compound substituted with alkyl halide or alkenyl halide having halogen other than fluorine (in this instance, as previously noted, the latter compound serves not only as the halogen supplier but at the same as the material substance as well).

When employing an oxygen-containing gas, the reaction conditions such as the reaction temperature, amount of ammonia, etc., will generally be the same as those in the absence of oxygen. The reaction temperature, however, should be adjusted so as to be a temperature below the combustion temperatures of the material substance and the product.

In general, when conjunctive use is made of an oxygen-containing gas, there is also the merit that the formation of dealkylated products as by-products is reduced, since the formation of hydrogen halide is curbed.

In order for clearer understanding of the invention, the following examples are given, it being understood that the examples given are not in limitation of the invention.

EXAMPLE 1

Thirty g. of beadlike activated alumina (about 3 mm. in diameter) were placed in a 25-mm. diameter Pyrex reaction tube. Then using a horizontal oven and regulating the oven temperature to 320° C., toluene was introduced into a vaporizer at the rate of 0.173 cc./min. and ammonia at about 120 cc./min. On the other hand, at a room temperature of 24.5° C. bromine was saturated in nitrogen at 240 cc./min., followed by introduction into the reaction tube.

The reaction was carried out for about 90 minutes, after which the product obtained was washed with a dilute acid and alkali and then analyzed by means of gas chromatography. The analytic values were as follows: benzene 2.6%, toluene 17.5%, bromotoluene 2.3%, benzonitrile 75.0%, benzyl bromide 2.8%.

EXAMPLE 2

The reaction was carried out for 90 minutes as in Example 1 except that the oven temperature was 355° C., the rate of flow of ammonia was 34 cc./min. and that of nitrogen (bromine saturated at room temperature 24° C.) was 227 cc./min.

The analytic values obtained by gas chromatography were as follows: benzene 1.2%, toluene 10.3%, bromotoluene 1.3%, benzonitrile 87.2%, benzyl bromide trace.

EXAMPLE 3

The reaction was carried out for 60 minutes as in Example 1 except that the oven temperature was 355° C., 28 g. of diatomaceous earth was used as the filler, the rate of flow of ammonia was 115 cc./min. and that of nitrogen (bromine saturated at room temperature 34.3° C.) was 227 cc./min.

The analytic values obtained by gas chromatography were as follows: benzene 1.8%, toluene 21.5%, bromotoluene 1.4%, benzonitrile 75.7%, benzyl bromide trace.

EXAMPLE 4

The reaction was carried out for 70 minutes as in Example 1 except that the oven temperature used was 370° C., 40 g. of alundum (predominantly alpha-alumina) was used as the filler, the rate of flow of the ammonia was 115 cc./min. and that of nitrogen (bromine saturated at room temperature 24.6° C.) was 210 cc./min.

The analytic values obtained by gas chromatography were as follows: benzene 2.5%, toluene 50.7%, bromotoluene 3.3%, benzonitrile 35.6%, benzyl bromide 7.9%.

EXAMPLE 5

The procedures as described in Example 1 were followed. The reaction conditions used were as follows:

Filler—30 g. of beadlike activated alumina (that on which 20% of ferric chloride has been adsorbed).
Oven temperature—350° C.
Rate of flow of toluene (liquid)—0.173 cc./min.
Rate of flow of ammonia—36 cc./min.
Rate of flow of nitrogen (bromine saturated at room temperature 24° C.)—about 20 cc./min.
Rate of flow of air—about 320 cc./min.

Analytic values obtained by gas chromatography: benzene 0.4%, toluene 42.7%, bromotoluene 0.7%, benzonitrile 56.2%.

EXAMPLE 6

The procedures as described in Example 1 were followed, the reaction conditions used being as follows:

Filler—30 g. of activated alumina.
Oven temperature—350° C.
Rate of flow of ethylbenzene (liquid)—0.173 cc./min.
Rate of flow of ammonia—36 cc./min.
Rate of flow of nitrogen (bromine saturated at room temperature 24° C.)—about 20 cc./min.
Rate of flow of air—362 cc./min.

Analytic values obtained by gas chromatography: toluene 0.8%, ethylbenzene 26.7%, styrene 50.6%, benzonitrile 8.3%, benzyl cyanide 4.2%, unconfirmed high boiling constituents 9.5%.

EXAMPLE 7

The procedures as described in Example 1 were followed, the reaction conditions used being as follows:

Filler—30 g. of activated alumina.
Oven temperature—350° C.
Rate of flow of cumen (liquid)—0.173 cc./min.
Rate of flow of ammonia—40 cc./min.
Rate of flow of nitrogen (bromine saturated at room temperature 23.9° C.—about 20 cc./min.
Rate of flow of air—about 320 cc./min.

Analytic values obtained by gas chromatography: toluene 1.6%, cumen 52.1%, alpha-methylstyrene 39.4%, benzonitrile 6.9%.

EXAMPLE 8

The reaction procedures described in Example 1 were followed. Using benzyl bromide as the halogen source, the experiment was carried out by means of the method of introducing into the vaporizer 2% by weight of benzyl bromide dissolved in toluene. The reaction conditions used were as follows:

Filler—30 g. of activated alumina.
Oven temperature—370° C.
Rate of flow of the benzyl bromide-toluene (liquid)— 0.173 cc./min.
Rate of flow of ammonia—40 cc./min.
Rate of flow of air—360 cc./min.

Analytic values obtained by gas chromatography: toluene 80.6%, bromotoluene 0.6%, benzonitrile 18.7%.

EXAMPLE 9

The reaction was carried out following the procedures as described in Example 1. Using iodine as the halogen, the experiment was conducted by means of a method of introducing into the vaporizer 5% by weight of iodine dissolved in toluene. The reaction conditions were as follows:

Filler—30 g. of activated alumina.
Oven temperature—370° C.
Rate of flow of the iodine-toluene solution (liquid)— 0.173 cc./min.
Rate of flow of ammonia—40 cc./min.
Rate of flow of air—360 cc./min.

Analytic values obtained by gas chromatography: toluene 81.1%, benzonitrile 18.9%.

NOTE.—In this case, the iodine is recovered not in the form of ammonium iodide but almost all as iodine molecules, being dissolved in the benzonitrile-toluene solution.

EXAMPLE 10

The reaction was carried out following the procedures described in Example 1. Using as the halogen source benzyl dichloride, the experiment was conducted by means of the method of introducing into the vaporizer 10% by weight of benzyl dichloride dissolved in toluene. The following reaction conditions were employed:

Filler—30 g. of activated alumina.
Oven temperature—400° C.
Rate of flow of the benzyl dichloride-toluene solution (liquid)—0.173 cc./min.
Rate of flow of ammonia 40 cc./min.
Rate of flow of air—360 cc./min.

Analytic values obtained by gas chromatography: benzene trace, toluene 79.6%, benzonitrile 20.4%.

EXAMPLE 11

The reaction procedures as described in Example 1 were followed. Using as the halogen source benzyl chloride, the experiment was carried out by employing the method of introducing into the vaporizer 33% by weight of benzyl chloride dissolved in ethylbenzene. The following reaction conditions were employed:

Filler—30 g. of diatomaceous earth.
Oven temperature—535° C.
Rate of flow of the benzyl chloridfe-ethylbenzene solution (liquid)—0.173 cc./min.
Rate of flow of ammonia—30 cc./min.
Rate of flow of air—360 cc./min.

Analytic values obtained by gas chromatography: benzene 2.2%, toluene 6.1%, ethylbenzene 56.9%, styrene 33.3%, benzonitrile 2.3%.

EXAMPLE 12

The procedures as described in Example 1 were followed. Using iodoform as the halogen source, the experiment was conducted by the method of allowing 2.85% by weight of iodoform dissolved in toluene to stand for several hours at room temperature, after which this solution was introduced into the vaporizer. The reaction conditions employed were as follows:

Filler—30 g. of diatomaceous earth.
Oven temperature—400° C.
Rate of flow of the iodoform-toluene solution (liquid)— 0.173 cc./min.
Rate of flow of ammonia (gas)—30 cc./min.
Rate of flow of air—360 cc./min.

Analytic values obtained by gas chromatography: unconfirmed low boiling constituents 1.4%, benzene 0.5%, toluene 79.8%, benzonitrile 18.3%.

EXAMPLE 13

The procedures as described in Example 1 were followed. Using bromoform as the halogen source the experiment was carried out by the method of allowing 1.5% by weight of bromoform dissolved in toluene to stand overnight at room temperature and then introducing this solution into the vaporizer.

The reaction conditions employed were as follows:

Filler—30 g. of diatomaceous earth.
Oven temperature—370° C.
Rate of flow of the bromoform-toluene solution (liquid)— 0.173 cc./min.
Rate of flow of ammonia—30 cc./min.
Rate of flow of air—240 cc./min.

Analytic values obtained by gas chromatography: benzene 0.5%, toluene 85.5%, bromotoluene 1.2%, benzonitrile 12.9%.

EXAMPLE 14

The procedures as described in Example 1 were followed. Using bromoform as the halogen source, the experiment was conducted by the method of introducing into the vaporizer a solution of 1.5% by weight of bromoform dissolved in toluene after having allowed the solution to stand overnight.

The following reaction conditions were employed:

Filler—30 g. of activated alumina.
Oven temperature—400° C.
Rate of flow of the bromoform-toluene solution (liquid)— 0.173 cc./min.
Rate of flow of ammonia—30 cc./min.
Rate of flow of air—240 cc./min.

Analytic values obtained by gas chromatography: benzene 0.3%, toluene 64.8%, bromotoluene 2.1%, benzonitrile 33.0%.

EXAMPLE 15

The procedures as described in Example 1 were followed, the experiment being carried out by the method of introducing into the vaporizer 150 g. of a solution of 33% benzene and 67% commercially available crude methylnaphthalene (alpha, 47.3%, beta, 51.2%, naphthalene 1.6%) to which had been added about 10 g. of bromine.

The reaction conditions employed were as follows:

Filler—30 g. of activated alumina.
Oven temperature—400° C.
Rate of flow of the bromine-methylnaphthalene-benzene solution (liquid)—0.173 cc./min.
Rate of flow of ammonia—30 cc./min.
Rate of flow of air—185 cc./min.

Analytic values obtained by gas chromatography: (values of those other than benzene) naphthalene 2.7%, alpha-methylnaphthalene 33.0%, beta-methylnaphthalene 41.3%, alpha-naphthonitrile 10.6%, beta-naphthonitrile 12.4%.

EXAMPLES 16–26

The procedures as described in Example 1 were followed. As the halogen source, hydrochloric acid was used. By passing air through concentrated hydrochloric acid cooled to nearly 0° C. with ice, the hydrochloric acid was saturated in air as a vapor. This hydrochloric acid vapor was fed to the reaction system. The amount of hydrochloric acid used was in all cases a small amount of the order of 2–4 mol percent, based on the toluene.

The activated alumina, active carbon and titanium dioxide, which were packed in the filler layer, were, in all cases, 30 g., and the hydrocarbon used was toluene.

The examples carried out under various reaction conditions (reaction temperatures, fillers, etc.) and the results obtained by means of gas chromatographic analysis of the products are illustrated in Table I.

TABLE I

| Example | Filler | Reaction Conditions | | | | | | Analytic Values of Products | | |
|---|---|---|---|---|---|---|---|---|---|---|
| | | Oven Temp., °C. | Toluene, cc./min. | NH₃, cc./min. | Air, cc./min. | N₂, cc./min. | HCl, Concentration | Benzonitrile, Percent | Toluene, Percent | Benzene, Percent |
| 16 | Activated alumina | 380 | 33.6 | 40 | 218 | | 11.0 N | 9.5 | 90.5 | |
| 17 | do | 400 | 33.6 | 40 | 217 | | 11.0 N | 18.2 | 81.8 | |
| 18 | do | 430 | 33.6 | 40 | 217 | | 11.0 N | 38.5 | 61.2 | 0.3 |
| 19 | do | 450 | 33.6 | 40 | 219 | | 11.0 N | 45.5 | 53.9 | 0.6 |
| 20 | do | 460 | 33.6 | 40 | 220 | | 11.0 N | 44.6 | 54.1 | 1.3 |
| 21 | do | 470 | 33.6 | 40 | 216 | | 11.0 N | 45.0 | 53.3 | 1.7 |
| 22 | do | 480 | 33.6 | 40 | 218 | | 11.0 N | 42.0 | 55.6 | 2.4 |
| 23 | do | 490 | 33.6 | 40 | 218 | | 11.0 N | 37.7 | 59.6 | 2.7 |
| 24 | do | 420 | 33.6 | 40 | 200 | 115 | 10.3 N | 33.2 | 66.8 | |
| 25 | Active carbon | 430 | 33.6 | 40 | 200 | | 10.3 N | 9.3 | 90.7 | |
| 26 | TiO₂ | 430 | 33.6 | 40 | 215 | | 11.0 N | 10.7 | 89.3 | |

EXAMPLES 27–28

The procedures as described in Example 16 were followed, except that hydrogen bromide (HBr) was used as the halogen source instead of hydrochloric acid (HCl) and the reaction conditions indicated in Table II, below, were employed to obtain the results given therein. The concentration of the HBr used was 8.54 N.

TABLE II

| Example | Filler, 30 g. | Reaction Conditions | | | | | Analytic Values of Products | | |
|---|---|---|---|---|---|---|---|---|---|
| | | Oven Temp., °C. | Toluene, cc./min. | NH₃, cc./min. | Air, cc./min. | N₂ cc./min. | Benzonitrile, percent | Toluene, percent | Benzene, percent |
| 27 | activated alumina | 365 | 33.6 | 40 | 200 | 115 | 5.3 | 94.7 | |
| 28 | do | 410 | 33.6 | 40 | 200 | 115 | 15.9 | 84.1 | |

EXAMPLES 29–32

Using hydrochloric acid as the halogen source, the nitrilation of chlorotoluene was carried out. The procedures as described in Example 16 were followed except that the reaction conditions employed were those indicated in Table III, below. Examples 29 and 30 illustrate the instances of the nitrilation of orthochlorotoluene, while Examples 31 and 32 are the instances of nitrilation of parachlorotoluene. In all cases, the filler used was 30 g. of activated alumina, and the hydrochloric acid was of a concentration of 10.5 N. The results obtained were shown in Table III.

TABLE III

| Example | Reaction Conditions | | | | | Gas Chromatographic Analysis Values | | | Class of Chlorotoluene Used |
|---|---|---|---|---|---|---|---|---|---|
| | Oven Temp., °C. | Chlorotoluene, cc./min. | NH₃, cc./min. | Air, cc./min. | N₂, cc./min. | Chlorobenzonitrile, Percent | Chlorotoluene, Percent | Toluene, Percent | |
| 29 | 430 | 30.5 | 40 | 250 | 115 | 19.7 | 80.3 | | o-Chlorotoluene. |
| 30 | 445 | 30.5 | 40 | 191 | 115 | 25.7 | 73.9 | 0.5 | Do. |
| 31 | 430 | 30.2 | 40 | 191 | 115 | 27.7 | 72.0 | 0.3 | p-Chlorotoluene. |
| 32 | 445 | 30.2 | 40 | 191 | 115 | 35.9 | 63.8 | 0.3 | Do. |

EXAMPLES 33–35

The procedures as described in Example 16 were followed, except for the reaction conditions indicated in Table IV, below, to carry out the nitrilation of xylene using hydrochloric acid as the halogen source. The material xylene was used in all cases as a mixed solution of 50 g. of benzene and 100 g. of xylene.

Example 33 illustrates the instance of the use of o-xylene, Example 34 of p-xylene and Example 35 of m-xylene.

In all cases, the filler used was 30 g. of activated alumina, and the hydrochloric acid was of a concentration 10 N. The results obtained thereby are shown in Table IV.

TABLE IV

| Example | Reaction Conditions | | | | Analytic Values of Products | | | | Class of Xylene |
|---|---|---|---|---|---|---|---|---|---|
| | Oven Temp., °C. | Xylene, cc./min. | NH₃, cc./min. | Air, cc./min. | Dinitrile, percent | Tolunitrile, percent | Xylene, percent | Toluene, percent | |
| 33 | 425 | 21.1 | 53.0 | 380 | 24.3 | 3.1 | 71.6 | 1.0 | o-Xylene. |
| 34 | 425 | 21.1 | 53.0 | 380 | 30.1 | 1.3 | 68.0 | 0.6 | p-Xylene. |
| 35 | 440 | 21.1 | 53.0 | 380 | 31.5 | 2.0 | 64.3 | 1.2 | m-Xylene. |

EXAMPLES 36 AND 37

Except for the reaction conditions indicated in Table V, below, the experiments were carried out otherwise as in Example 16 to effect the nitrilation of styrene using hydrochloric acid (HCl) and hydrogen bromide (HBr) as the halogen source. In either instances the filler used was 30 g. of activated alumina.

The concentrations of the concentrated hydrochloric acid and concentrated hydrogen bromide were 11 N and 8.5 N, respectively. Table V shows the instance of the use of HCl as Example 36 and that of HBr as Example 37.

TABLE V

| Example | Reaction Conditions | | | | Analytic Values of Products | | | | | |
|---|---|---|---|---|---|---|---|---|---|---|
| | Oven Temp., °C. | Styrene, cc./min. | NH₃, cc./min. | Air, cc./min. | Benzo-nitrile, percent | Styrene, percent | Ethyl-benzene, percent | Toluene, percent | Unconfirmed High Boiling Constituent | Benzyl cyanide |
| 36 | 420 | 31.0 | 46.5 | 250 | 22.0 | 56.1 | 10.2 | 0.8 | 9.8 | 1.1 |
| 37 | 425 | 31.0 | 46.5 | 250 | 20.1 | 57.0 | 10.5 | 0.9 | 11.0 | 0.5 |

EXAMPLES 38 AND 39

Except for the reaction conditions indicated in Table VI, below, the experiments were carried out otherwise as in Example 16 to effect the nitrilation of paravinyltoluene using hydrochloric acid (HCl) as the halogen source. As the filler, 30 g. of diatomaceous earth was used. The concentration of hydrochloric acid used was 10.8 N.

In Table VI are shown the results obtained by varying the reaction temperature.

TABLE VI

| Example | Reaction Conditions | | | | Analytic Values of Products | | | | |
|---|---|---|---|---|---|---|---|---|---|
| | Oven Temp., °C. | Vinyl toluene, cc./min. | NH₃, cc./min. | Air, cc./min. | Vinyl benzo nitrile, percent | Tereph thalo nitrile, percent | p-Xylene, percent | Toluene, percent | Vinyl toluene percent |
| 38 | 400 | 29.4 | 49.1 | 290 | 20.2 | 0.5 | 1.5 | 1.0 | 76.8 |
| 39 | 440 | 29.4 | 49.1 | 290 | 41.2 | 3.2 | 3.6 | 2.6 | 49.9 |

What we claim is:

1. A process for producing an aromatic nitrile which comprises reacting in a vapor or gaseous phase by heating to a temperature in the range of about 300° C., to 550° C. a mixture consisting of a halogen gas selected from the group consisting of chlorine, bromine and iodine, a substituted aromatic compound selected from the group consisting of substituted benzene, substituted naphthalene and substituted nucleus-hydrogenated compounds thereof having as its substituent at least one member selected from the group consisting of alkyl and alkenyl having not more than four carbon atoms, and ammonia.

2. The process according to claim 1 wherein said mixture is heated in the presence of an oxygen-containing gas.

3. The process according to claim 1 wherein said heating is effected in the presence of a filler.

4. The process according to claim 3 wherein said filler is at least one substance selected from the group consisting of aluminum oxide, active carbon, diatomaceous earth, magnesium oxide, titanium dioxide, zinc oxide and gypsum.

5. A process for producing an aromatic nitrile which comprises reacting in a vapor or gaseous phase by heating to a temperature in the range of about 300° C. to 550° C. a mixture consisting of a halide capable of generating a halogen gas selected from the group consisting of chlorine, bromine and iodine in the presence of an oxygen-containing gas, a substituted aromatic compound selected from the group consisting of substituted benzene, substituted naphthalene and substituted nucleus- hydrogenated compounds thereof having as its substituent at least one member selected from the group consisting of alkyl and alkenyl having not more than four carbon atoms, ammonia and an oxygen-containing gas.

6. The process according to claim 5 wherein said halide is at least one member selected from the group consisting of hydrogen halide, haloform, and halo-substituted derivatives of said alkyl and alkenyl-substituted aromatic compounds.

7. The process according to claim 5 wherein a halogen gas is present with said halide.

8. The process according to claim 5 wherein said heating is effected in the presence of a filler.

9. The process according to claim 8 wherein said filler is at least one substance selected from the group consisting of aluminum oxide, active carbon, diatomaceous earth, magnesium oxide, titanium dioxide, zinc oxide and gypsum.

References Cited

UNITED STATES PATENTS 2,890,253  6/1959  Mullineaux et al. __ 260—669 XR
3,247,273  4/1966  Mantell et al. _____ 260—669

CHARLES B. PARKER, *Primary Examiner.*

D. H. TORRENCE, *Assistant Examiner.*